United States Patent [19]
Karras et al.

[11] Patent Number: 5,326,974
[45] Date of Patent: Jul. 5, 1994

[54] RANGE-FINDING METHOD AND DEVICE

[75] Inventors: Matti Karras; Juha Kostamovaara, both of Oulu, Finland

[73] Assignee: Rautaruukki Oy, A Corp. of Finland, Oulo, Finland

[21] Appl. No.: 863,300

[22] PCT Filed: Dec. 19, 1990

[86] PCT No.: PCT/FI90/00304
§ 371 Date: Jun. 19, 1992
§ 102(e) Date: Jun. 19, 1992

[87] PCT Pub. No.: WO91/09324
PCT Pub. Date: Jun. 27, 1991

[30] Foreign Application Priority Data
Dec. 20, 1989 [FI] Finland .................................. 896152

[51] Int. Cl.⁵ .............................................. G01S 17/08
[52] U.S. Cl. .................................... 250/366; 250/369; 250/393; 250/394
[58] Field of Search .................... 250/336.1, 366, 369, 250/393, 394

[56] References Cited
U.S. PATENT DOCUMENTS

| | | |
|---|---|---|
| 3,099,744 | 7/1963 | Spooner . |
| 3,567,938 | 3/1971 | Piekenbrock ...................... 250/308 |
| 3,718,817 | 2/1973 | Afanasjev et al. . |
| 4,559,597 | 12/1985 | Mullani ......................... 250/363.03 |

Primary Examiner—Carolyn E. Fields
Attorney, Agent, or Firm—Willian Brinks Hofer Gilson & Lione

[57] ABSTRACT

The invention relates to a method for determining the distance of a target in difficult industrial conditions, method in which (i) one of the gamma quanta produced from a radioactive source in annihilation and traveling in opposite directions is aimed at the target and the other one at a detector, which detects it, and time measuring starts; (ii) the quantum Compton-scattered from the target is detected by the same or a separate detector, and time measuring stops; (iii) the distance of the target is calculated from the time difference between (i) and (ii). The invention also relates to a device for carrying out the method, the device comprising a radioactive source, a scintillation crystal counter/counters, a time-amplitude converter (TAC) and a pulse height analyzer (PHA).

12 Claims, 6 Drawing Sheets

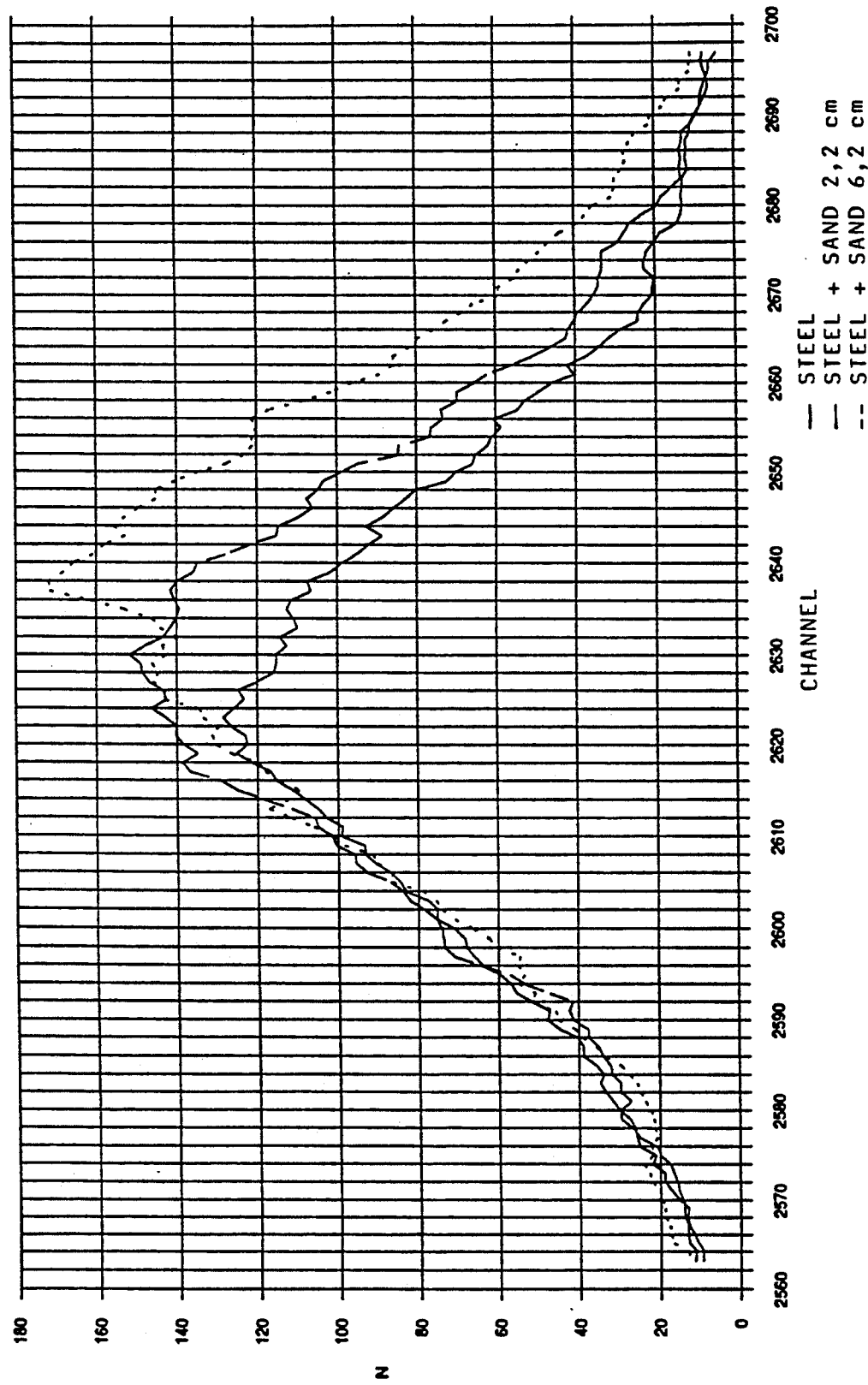

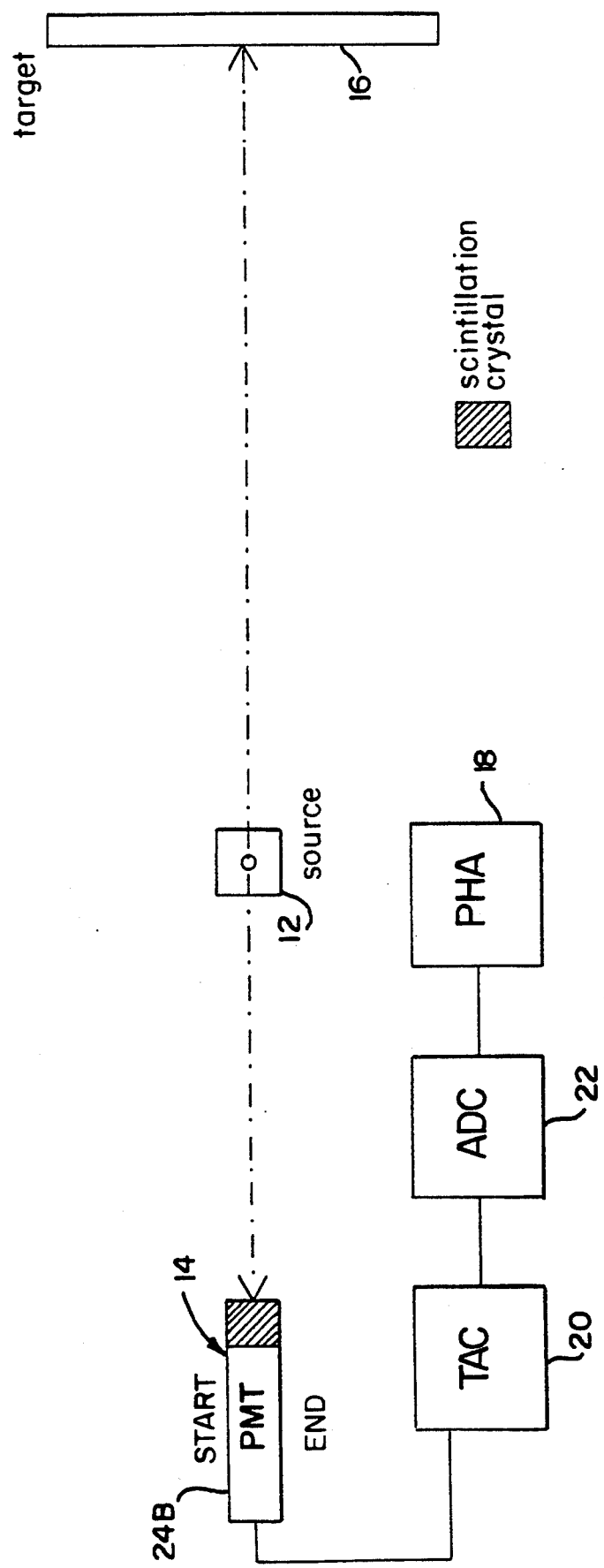

RANGE-FINDING METHOD AND DEVICE

BACKGROUND OF THE INVENTION

The present invention relates to a method and device for determining a distance on the basis of measuring the time of travel of gamma radiation.

In the metal industry there are problems of range-finding related to the surface level in ore reduction furnaces; these problems are complicated by the corroding and hot flue gases present in the range-finding space. The object of the present invention is to eliminate these problems.

Among the range-finding methods currently used in industry, the method according to the present invention is in principle similar to pulsed time-of-flight laser range-finding, in which the time of travel of light is used for range-finding. Owing to the limitations associated with the use of the laser, it cannot be used in all range-finding applications. The most significant of the limitations is perhaps the requirement of visual contact with the target to be measured by the laser beam. For this reason, for example, smoke, gases, dust, etc., prevent range-finding or hamper it. Another difficulty in the use of the laser appears in the measuring of targets having a high temperature, which increases noise in the measuring receiver and thereby increases imprecision in the measurement. On the other hand, imprecision increases because the propagation speed of light changes when the temperature of the medium changes. However, in industry there are numerous range-finding targets of the type mentioned above, and therefore it is necessary to develop other possible range-finding methods.

SUMMARY OF THE INVENTION

It has now been discovered that gamma radiation can be exploited in range-finding. Gamma quanta travel in air at the vacuum speed of light, regardless of the pressure, humidity or temperature of the air. Furthermore, owing to their high energy they will penetrate media (about 10 $g/cm^2$), and so visual contact with the target is not needed. The method and device according to the invention are thus suitable for the determination of the surface level in the metal industry, for example in converters in the steel industry and in flash smelting furnaces in the copper industry. Furthermore, the invention also has uses in other metal industry processes, in which light arc furnaces are used in which the melting and reduction of the batch cannot be monitored using present-day surface level meters. The surface to be measured may be metal, mineral, or metal covered by slag. The method and device according to the invention can also be used for determining the thickness of a layer of slag or ceramics on top of metal. It is a further advantage of the method and device according to the invention that they save energy by improving process control. The source used may be a positron-emitting radio isotope, for example an Na-22 isotope.

BRIEF DESCRIPTION OF THE DRAWINGS

FIG. 5 is an example of a width of a distance spectrum which may be used to measure thickness of a layer or a target; and FIG. 6 is a generic block schematic diagram of another embodiment of the range finding device.

DETAILED DESCRIPTION OF THE PREFERRED EMBODIMENTS

Figure 1:
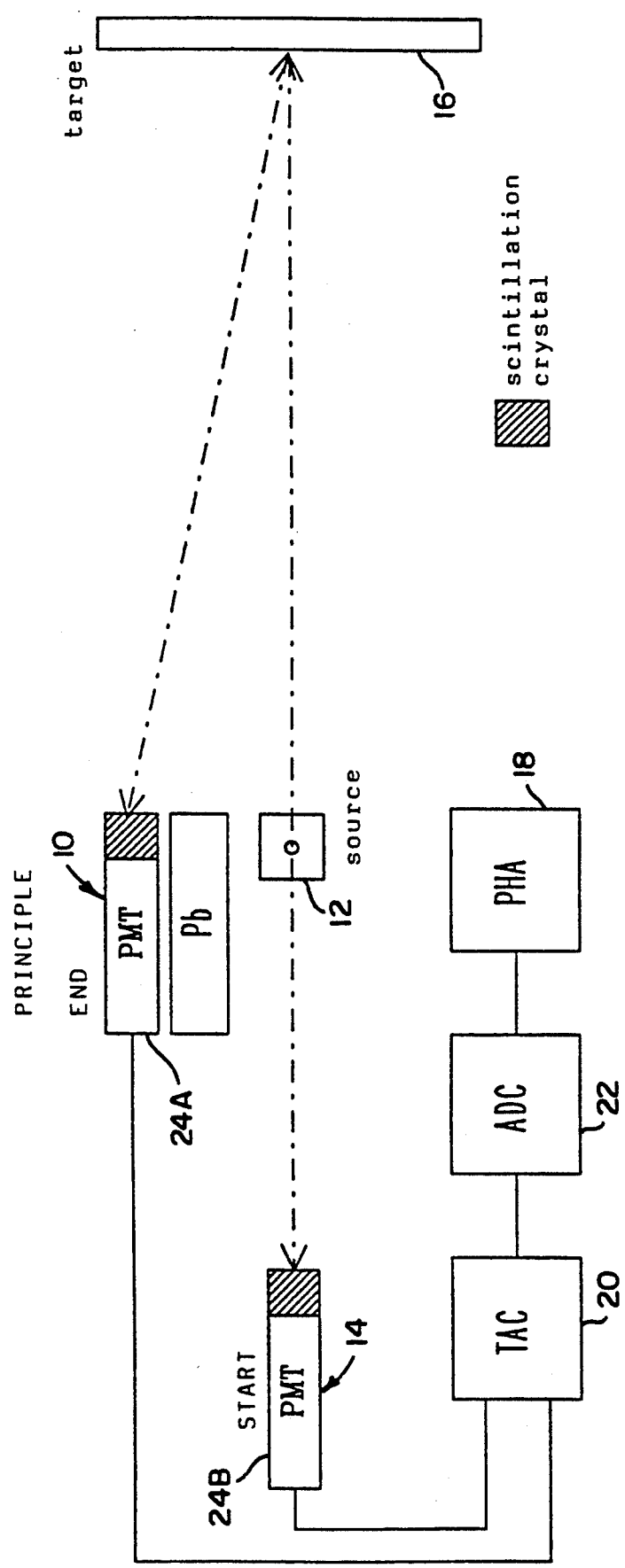
FIG. 1 is a generic block schematic diagram of a range-finding device constructed according to the teachings of the present invention.

In the method according to the invention, collimated gamma radiation is emitted to the target 16 to be measured, and the scattered gamma radiation returning from the target 16 is detected using a detector 14 or 10, as shown in FIGS. 1 and 6, respectively. The invention is based on $\beta^+$annihilation. When the source of radiation used is, for example, an Na-22 radio isotope, a 1.28 MeV gamma quantum and a positron are produced as a result of radioactive decay. The life of the positron produced is short, after which it is annihilated with an electron. In the annihilation the masses of the positron and the electron are converted into electromagnetic radiation energy. Thus two 0.5 MeV gamma quanta, departing in precisely opposite directions and usable in the measuring, are produced.

One quantum being emitted from the source of radiation is detected by the START detector 14, and time measuring starts. The other quantum travels in the opposite direction on the straight line which connects the source 12 and the detector 14. The gamma beam thus formed is aimed at the target 16 the distance of which is to be determined. When the gamma radiation impinges upon the metal surface, Compton scatter occurs. A quantum scattered from the target 16 will depart with a probability corresponding to the solid angle towards the END detector 10 and, when impinging upon it, will stop the measuring of the time. It is also possible to use the START detector 14 as the END detector 10, as shown in FIG. 6, if the measured distance is so long that the START and END pulses can be distinguished from each other by the same detector. Since it is known that gamma radiation travels at the vacuum speed of light, the desired distance between the detectors 10 and 14 and the metal surface can be calculated from the travel time of each gamma quantum. The gamma quanta are detected by using scintillation crystals; when impinging upon them they produce a pulse of light. The intensity of the pulse of light depends on the scintillator and on the energy of the quantum impinging upon the crystal. The produced pulse of light is amplified and converted into electric form by using a photo-multiplier tube 24A and 24B (PMT). The pulses received from the tubes 24A–24B are applied to a time-amplitude converter 20, which converts into an output pulse amplitude the time difference between the gamma quanta which have impinged upon the START and END detectors 10 and 14. The measuring result obtained is stored in a pulse height analyzer. A diagram of the principle of the measuring system is depicted in FIG. 1. The detectors 10 and 14 used in the device should be maximally rapid; at present, scintillation crystal detectors are such. The scintillator used may be, for example, barium fluoride ($BaF_2$) or a scintillation plastic (e.g. NE 104).

The electronics of the device according to the invention includes the actual time-interval measuring electronics, which is optimized for the $BaF_2$ scintillation crystal detectors used as gamma detectors, and a PC-based result collection device. BaF detectors have the advantage of good detection efficiency. However, the pulses of light received from the detector have a component having a long time constant (approx. 600 ns), which may at high frequencies weaken the performance of the measuring electronics, unless the electronics is designed specifically for the pulses of BaF$_2$ detectors. The output of the time-interval measuring electronics is an analog pulse, the height of which is proportional to the time interval being measured. The pulse is A/D-converted and fed to the PC for the collection and analysis of the results. The apparatus is installed, for example, above a converter so that it can be used for determining the surface level of molten steel in the converter. The steel is at a temperature of approx. 1500° C., and so the apparatus must be capable of withstanding considerable radiation of heat. This is achieved by using thermal shielding and cooling.

The essential characteristics of the invention are disclosed in the accompanying claims.

There is a random error, corresponding to approx. ±5 cm of distance, in the travel time of each quantum pair. The error decreases on the basis of the law of the square root of the number of observations, i.e. when the number of observations increases one-hundred-fold, the error decreases to one-tenth. If the number of observations is N, the random error has been decreased to $1/\sqrt{N}$th. The number of gamma pairs detected is restricted by the fact that the Compton-scattered quanta depart almost uniformly in all directions, so that the return quanta detected by the END detector 10 are reduced in an inverse proportion to the square of the distance. The intensity of the source 12 cannot be increased indefinitely, since the START detector 14 will be saturated.

On the other hand, if the activity of the source 12 is increased, the probability that the quanta causing the START signal and the END signal are derived from different annihilations increases. However, this probability is low, since the dead time of the TAC 20 is shorter than the average interval of a new quantum arriving in the beam of the START detector 14. Besides, random measuring results will not accumulate within a delay corresponding to the distance of the target 16 of the range-finding.

Figure 2:
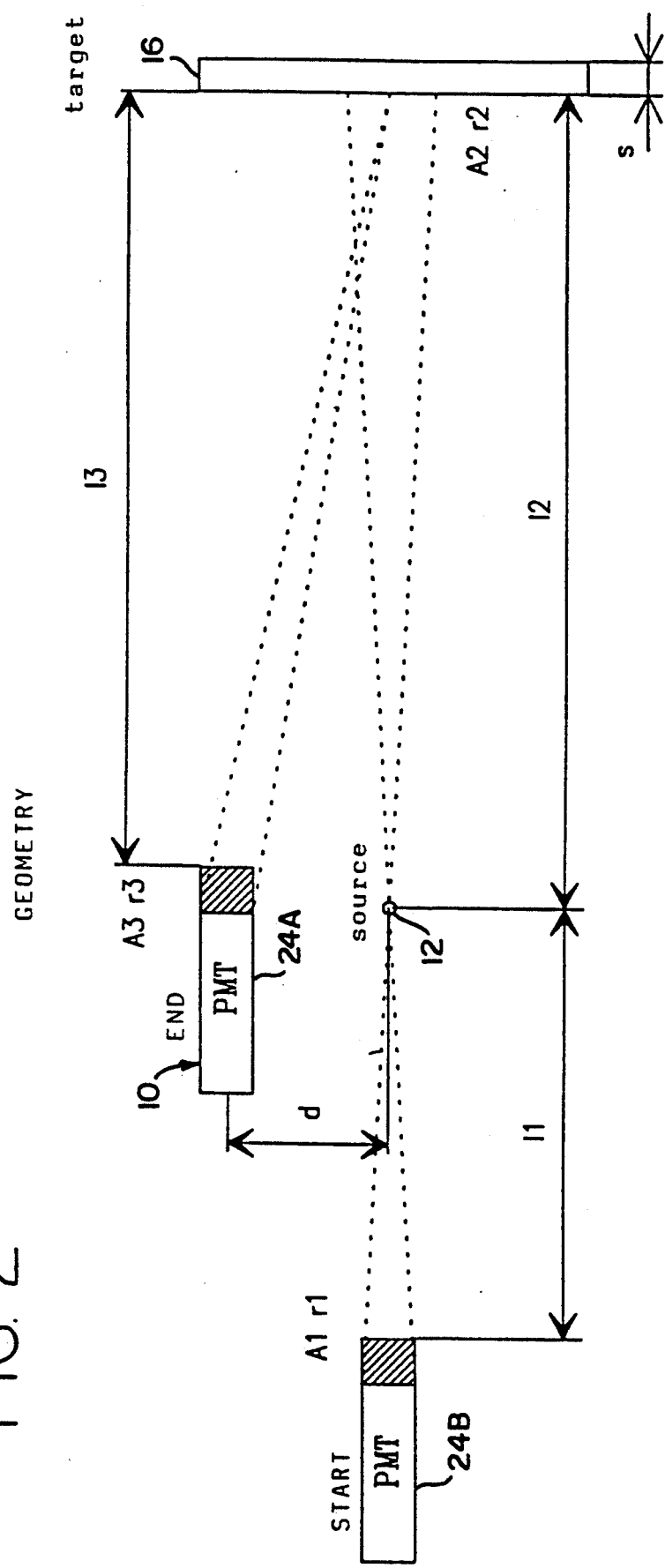
FIG. 2 is a functional diagram of the device of FIG. 1.

Factors affecting the measuring pulse rate include the geometry of the system, the activity of the source 12, the degrees of efficiency of the scintillation crystals, and the material of the target 16. The Compton scatter taking place at the target also has an effect on the measuring rate, but this factor cannot be affected. FIG. 2 depicts the geometry of the measuring. It can be seen in FIG. 2 that the solid angle of the START detector 14 determines the direction of the gamma quanta used in the measuring. For this reason the average pulse rate $T_{start}$ can be calculated as a proportion, determined by the solid angle, of the activity:

$$T_{start} = e_1 \cdot \frac{Q}{2} \cdot \left[\frac{r_1}{l_1}\right]^2 \qquad (1)$$

where
$e_1$ = efficiency of START
$r_2$ = radius of START
$Q$ = activity of the source [Bq]
$l_1$ = distance between START and the source The activity is taken in double, since two annihilation gamma quanta are produced per each radioactive decay.

At the target 16 the scattering is from electrons the number of which $N_e$ is obtained on the basis of the properties of the material, the area $A_2$, and the penetration depth s of the scattered quanta:

$$N_e = \frac{\rho \cdot Z}{M} \cdot N_A \cdot A_2 \cdot s \qquad (2)$$

where
$\rho$ = density of the target
$Z$ = atomic number of the atoms of the target
$M$ = atomic weight of the target [g/mol]
$N_A$ = Avogadro constant 6.202 E23 [1/mol]
s = mean penetration depth of gamma quanta
$A_2$ = area in the object, determined by the geometry The ratio of the quanta scattered into a certain solid angle to the quanta arriving within the area $A_2$ is $$\frac{d_e \sigma_T}{d\Omega} \cdot \frac{1}{A_2} = 4,902 \; E - 27 \; \text{cm}^2/(\text{electr.sr}) \cdot \frac{1}{A_2} \qquad (3)$$

where $\frac{d_e \sigma_T}{d\Omega}$ = differential electron cross section in return Compton scatter The probability of quanta departing from the target 16 towards the END detector 10 is determined on the basis of the solid angle of the detector 10:

$$P_{end} = N_e \cdot \frac{d_e \sigma_T}{d\Omega} \cdot \frac{1}{A_2} \cdot \Omega_2 = \qquad (4)$$

$$\frac{\rho \cdot Z}{m} \cdot N_A \cdot S \cdot \pi \cdot \left[\frac{r_3}{l_3}\right]^2 \cdot \frac{d_e \sigma_T}{d\Omega}$$

where
$\Omega_2$ = solid angle of END at the target
$r_3$ = radius of END
$l_3$ = distance between END and the target When the efficiency $e_3$ of the END detector is further taken into account, the formula obtained for the measuring rate is:

$$T = T_{start} \cdot P_{end} \cdot e_3 \qquad (5)$$

i.e.

$$T = e_1 \cdot \frac{Q}{2} \cdot \left[\frac{r_1}{l_1}\right]^2 \cdot \frac{\rho \cdot Z}{M} \cdot N_A \cdot s \cdot \frac{d\sigma_T}{d\Omega} \cdot e_3 \cdot \pi \cdot \left[\frac{r_3}{l_3}\right]^2$$

The method according to the invention is applicable to uses in which a high measuring rate is not required. The rate can be increased by increasing the activity of the source 12 and by using more effective scintillation crystals. The limit for rate increase is at present the highest possible rate of START pulses, which is in the order of 100,000–200,000 1/s. When scintillation crystals having a diameter of approx. 5 cm are used, this limit has the effect that results will accumulate at a rate of approx. 10 per minute from a distance of six meters. When averaging of 100 results is used, results are obtained at approx. ten-minute intervals and the imprecision of the distance is in this case ±0.5 cm.

The resolution is dependent not only on the resolution of the A/D converter 22 of the pulse height analyzer 18 but also on the resolution of the TAC 20, on the various delays of light production by scintillation crystals, on the size of the source 12, and on the travel time differences in the photo-multiplier tubes 14A and 24B at the different points of the tube lens. Of these, the source worsens the resolution of a single measurement directly according to its size. The geometry of the measuring also has its effect on the resolution, owing to the distance difference caused by scatter from different points of the target 16. Typically the half-value width of the result distribution, due to the measuring apparatus, is approx. 0.3 ns, which corresponds to 4.5 cm in the determination of distance. The resolution of a single measurement obtained according to the half-value width of the method and device according to the present invention is 10 cm. The resolution can be improved by averaging the measurement results. Depending on the number N of the results, the resolution will improve by the coefficient $1/\sqrt{N}$.

As a result of double coincidences caused by background radiation, by temporally successive annihilations, and by 1.28 MeV gamma quanta produced in the source 12, random measuring results are produced which are distributed rather evenly over the entire range (0-60 ns, i.e. 0-9 m). The distribution of the results from double coincidences is dependent on the locations of the START and END detectors 10 and 14, respectively. In addition, results are obtained from random scatterings from around the system. In order to reduce extra measuring results, the source 12 and the detectors 10 and 14 should be shielded as well as possible by enveloping them with, for example, lead in all directions except in the direction of the target 12.

The invention is elucidated below with the help of examples. In the measurements, the geometry according to FIGS. 1 and 2 was used, in which the following dimensions were maintained constant:

$l_1 = 40$ cm
$d = 24.6$ cm
$l_2 - l_3 = 10$ cm

The properties of the materials used were as follows:

Target: iron $\rho$ = 7.83 g/cm$^3$
$Z$ = 26
$M$ = 55.8 g/mol
$s$ ≈ 2.3 cm (experimentally obtained thinnest iron thickness with a scatter of 100%)

Scintillation crystals: NE 104

$e_1 = e_3 = 0.2$
$r_1 = r_3 = 2.5$ cm

Source: Na-22

$Q = 0.3$ mCi $= 11.1$ E6 Bq

EXAMPLE 1

The effect of the background was investigated using the above-mentioned values and geometry. The random results were distributed over 3200 discrete distance values so that the average rate per channel was 0.4 1/h. Reducing the background by means of lead shields reduced the background to 0.1 1/h. Thus the proportion of the results which had accumulated within the range of the half-value width, of all of the measuring results, increased from 15% to 32%, the distance being 120 cm.

Figure 3:
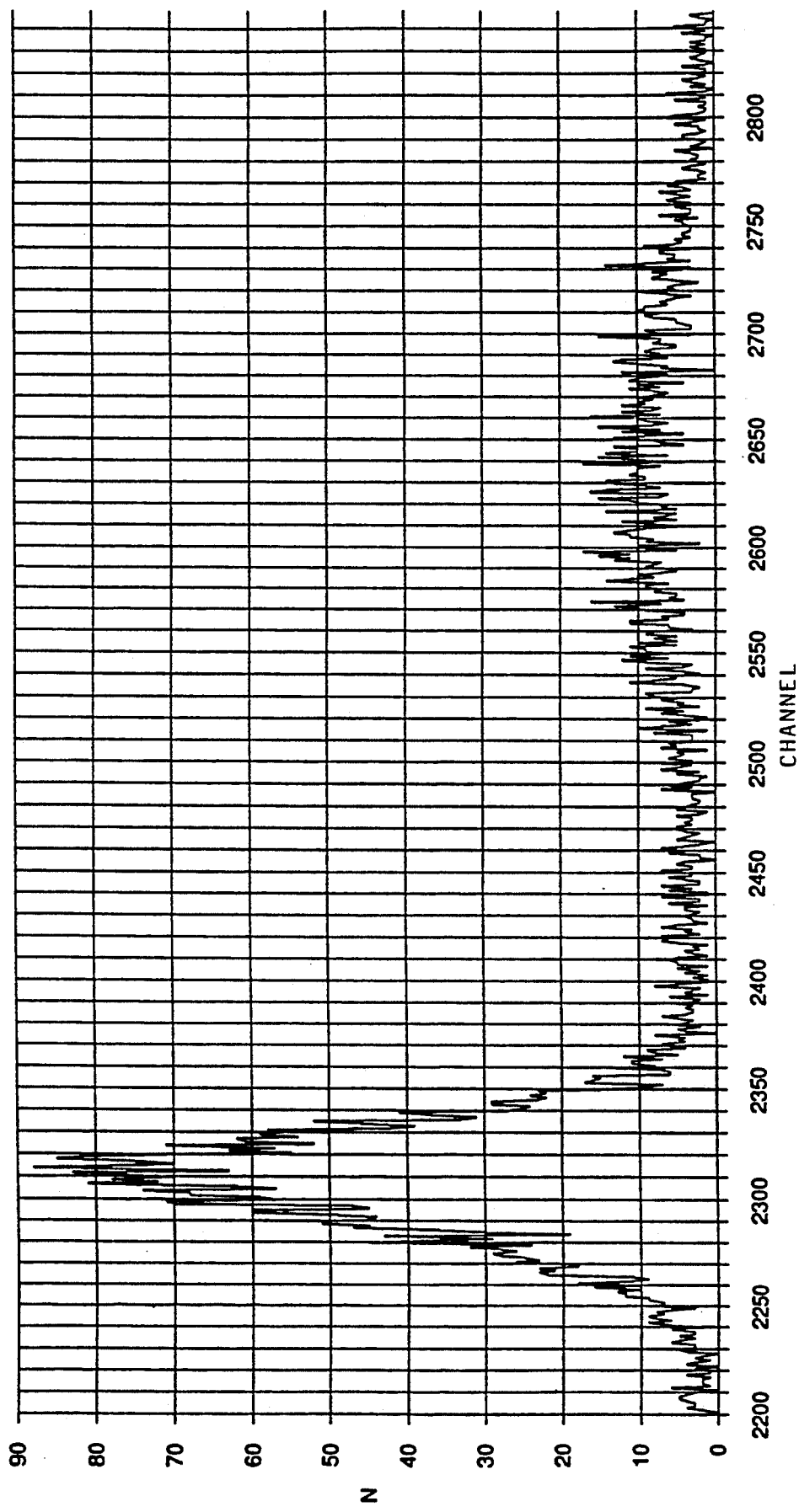
FIG. 3 is an example of a distance spectrum obtained by the device of FIG. 1.

FIG. 3 depicts an example of the distance spectrum. With the ADC settings used, channel 2803 corresponded to a distance of 0 and channel 2000 to a distance of 226.9 cm. The figure shows that the peak of the result distribution is on channel 2307, corresponding to a distance of 140 cm. The extra accumulation between channels 2500 and 2800, visible in the figure, is due to double coincidences and to random scatterings from the lead shields.

EXAMPLE 2

The effect of a layer of a medium in front of the target 16 was measured. A chipboard 2 cm thick, sand layers of different thicknesses, bricks, and slag tiles were used between the source 12 and the target 16.

Figure 4:
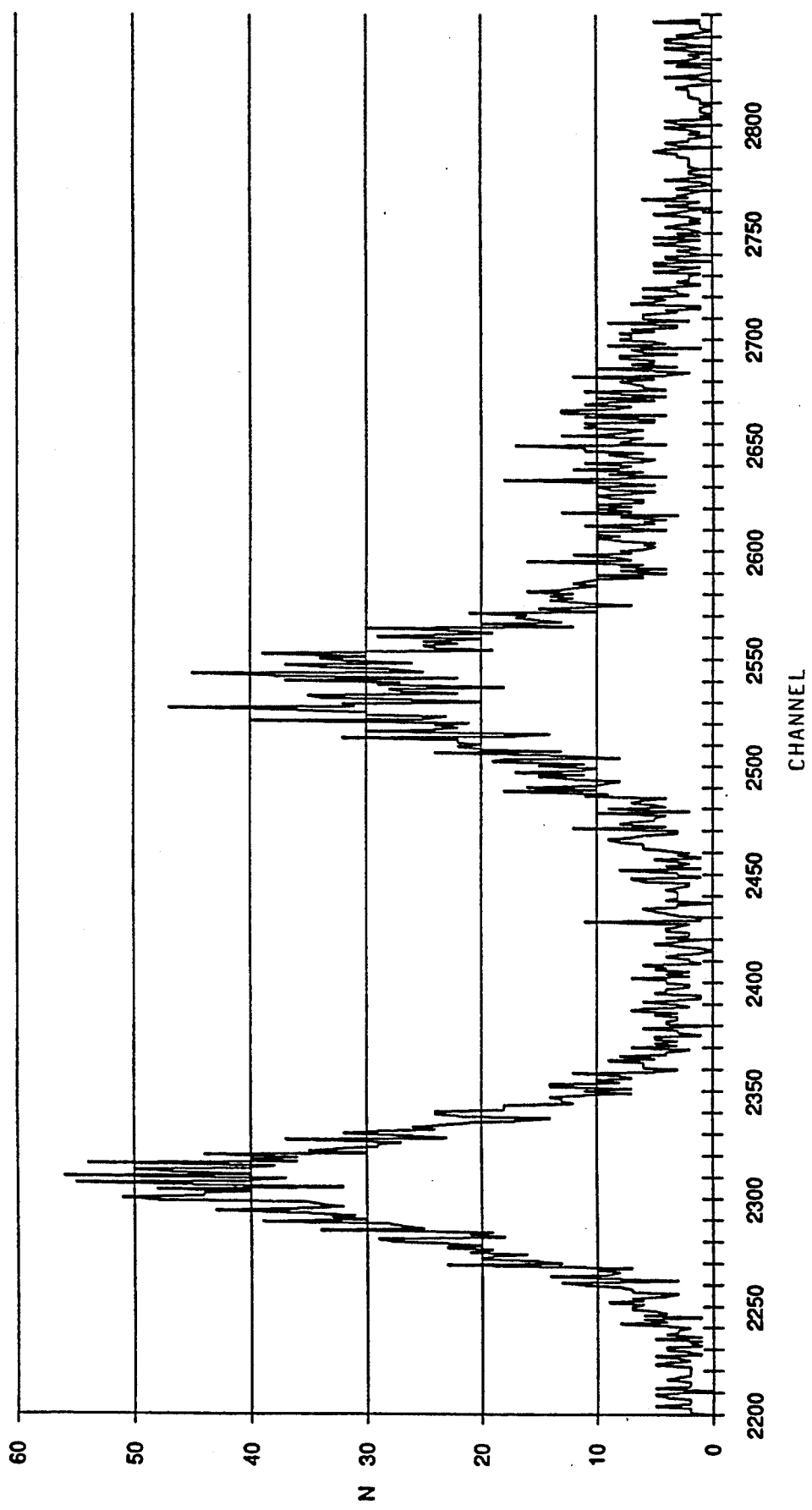
FIG. 4 is another example of a distance spectrum obtained by the device of FIG. 1.

The chipboard was used for checking whether rangefinding can be carried out through an obstacle. In the measurement, a chipboard 20 mm thick was placed between the source 12 and the target 16, at a distance of 75 cm from the source 12, the distance of the steel target 16 being 140 cm. The number of measuring results obtained from the steel was reduced by 30%, and the chipboard caused its own, slightly smaller accumulation. Nevertheless, the accumulation of results caused by the steel was clearly observable. The distance spectrum is shown in FIG. 4.

A layer of sand in front of the target 16 caused, on the basis of the measurements, an increase in the half-value width of the result distribution, depending on the thickness of the sand layer. FIG. 5 shows the effect of sand layers of 2.2 cm and 6.2 cm on the distance spectrum. In the measurements the sand was placed in a box made of polymethyl methacrylate, such as PLEXIGLASS, for which reason the thickness of the medium layer was 0.6 cm greater than that of the sand layer. The results showed that the half-value width increased by approx. 1.7 mm per one cm of the sand layer. In FIG. 5, channel 2626 corresponds to a distance of 50 cm, and the channel interval is 2.83 mm. With slag and bricks the results were similar to those obtained with sand. It was noted that, if precise results are desired, the shape of the distance spectrum should be analyzed more precisely from the layer thicknesses, and attention should be paid to the width of the spectrum. This, of course, requires considerably longer measuring times than used in mere rangefinding.

What is claimed is:

1. A method for determining distance of a target comprising: (i) one of the gamma quanta, traveling in opposite directions, created from a radioactive source in $\beta^+$ annihilation, travels to the target and the other one to a detector, which detects it, and time measuring starts; (ii) a quantum Compton-scattered from the target is detected by the same or a separate detector, and time measuring stops; (iii) the distance of the target is calculated from the time difference between (i) and (ii).

2. A method according to claim 1 wherein the target is steel.

3. A method according to claim 1 wherein the radioactive source is a positron emitter.

4. A method according to claim 1 wherein a layer of medium is disposed between the target and the source.

5. A method according to claim 1 wherein a layer of medium is disposed on the target.

6. A method according to claim 5 wherein the layer of medium on the target is slag.

7. A method according to claim 5 wherein the layer of medium on the target has a thickness measured on the basis of a width of a distance spectrum.

8. A method according to claim 1 wherein the radioactive source is a Na-22 radioisotope.

9. A device for determining distance of a target comprising:
   (a) a radioactive source in which two gamma quanta, traveling in opposite directions, are produced;
   (b) a first scintillation crystal detector, which detects the first gamma quantum and is located on the opposite side of the radioactive source in relation to the target;
   (c) a second scintillation crystal detector, which detects the second gamma quantum, traveling to the target and being Compton scattered from it, which detector may be the same as the detector detecting the first gamma quantum or another, separate detector;
   (d) a time-amplitude converter, to which pulses from the first and the second scintillation crystal detectors are taken and which converts the time difference between the observed first and second gamma quanta into an output pulse amplitude; and
   (e) a pulse height analyzer, in which the measuring result is stored and printed out.

10. A device according to claim 9 wherein the radioactive source is a positron emitter.

11. A device according to claim 9 wherein the radioactive source is a Na-22 isotope.

12. A device according to claim 9 wherein the radioactive source is a $\beta^+$ emitter.

* * * * *

UNITED STATES PATENT AND TRADEMARK OFFICE
CERTIFICATE OF CORRECTION

PATENT NO. : 5,326,974
DATED : July 5, 1994
INVENTOR(S) : Karras et al.

It is certified that error appears in the above-indentified patent and that said Letters Patent is hereby corrected as shown below:

<u>On the Title Page</u>

In column 1, line 1 of the "Inventors" data, delete "both" and substitute --and Jorma Oikarinen all--.

Signed and Sealed this

Nineteenth Day of March, 1996

*Attest:*

BRUCE LEHMAN

*Attesting Officer*     *Commissioner of Patents and Trademarks*